US012630052B2

(12) United States Patent
Cooper et al.

(10) Patent No.: US 12,630,052 B2
(45) Date of Patent: May 19, 2026

(54) QUICK CHARGING MULTI-VOLTAGE BATTERY MANAGEMENT SYSTEM

(71) Applicant: Green Cubes Technology, LLC, Kokomo, IN (US)

(72) Inventors: Anthony Cooper, Kokomo, IN (US); James Robert Pressgrove, Kokomo, IN (US); Jamie McDaniel, Kokomo, IN (US)

(73) Assignee: Green Cubes Technology, LLC, Kokomo, IN (US)

( * ) Notice: Subject to any disclaimer, the term of this patent is extended or adjusted under 35 U.S.C. 154(b) by 741 days.

(21) Appl. No.: 17/787,674

(22) PCT Filed: Jan. 8, 2021

(86) PCT No.: PCT/US2021/012731
§ 371 (c)(1),
(2) Date: Jun. 21, 2022

(87) PCT Pub. No.: WO2021/142286
PCT Pub. Date: Jul. 15, 2021

(65) Prior Publication Data
US 2023/0009026 A1 Jan. 12, 2023

Related U.S. Application Data

(60) Provisional application No. 62/959,293, filed on Jan. 10, 2020.

(51) Int. Cl.
*H02J 7/00* (2026.01)
*B60L 58/19* (2019.01)
(Continued)

(52) U.S. Cl.
CPC .............. *B60L 58/19* (2019.02); *B60L 58/22* (2019.02); *H02J 7/575* (2026.01); *H02J 7/96* (2026.01)

(58) Field of Classification Search
USPC .................................................. 320/109, 116
See application file for complete search history.

(56) References Cited

U.S. PATENT DOCUMENTS

| 2004/0036445 A1* | 2/2004 | Trembley | .............. | H02J 7/0047 |
| | | | | 320/116 |
| 2006/0152195 A1* | 7/2006 | Ishishita | ............... | H02J 7/0014 |
| | | | | 320/132 |

(Continued)

FOREIGN PATENT DOCUMENTS

| EP | 2623379 B1 | 5/2019 |
| JP | 2005317484 A | * 11/2005 |

(Continued)

OTHER PUBLICATIONS

Patent Cooperation Treaty (PCT), International Searching Authority, International Search Report, PCT/US2021/012731, Dated Mar. 31, 2021.

(Continued)

*Primary Examiner* — Samuel Berhanu
(74) *Attorney, Agent, or Firm* — Reichel Stohry Dean LLP; Mark C. Reichel; Natalie J Dean

(57) ABSTRACT

Disclosed herein are battery management systems (BMS) for controlling the operating state of a battery pack device, as well as methods for changing the operating state of a battery pack device. The battery pack may have multiple cells therein, each cell capable of generating multiple different voltages to allow more energy (voltage×current) to be quickly and efficiently put into the battery, thus optimizing battery charging (i.e., reducing battery charging times). These battery packs may change from operating in series, to operating in parallel, when desired, while utilizing affordable relays and more affordable electrical components. These battery packs may be comprised of any number of cells and can controlled and/or operated by the BMS, for (Continued)

110 optimal battery charging, or for optimal discharging, as desired. The BMS may be any type of control logic and/or software, operable to control and/or operate the battery packs.

16 Claims, 2 Drawing Sheets

(51) Int. Cl.
  *B60L 58/22*       (2019.01)
  *H02J 7/50*        (2026.01)
  *H02J 7/96*        (2026.01)

(56)              References Cited

U.S. PATENT DOCUMENTS

| | | | |
|---|---|---|---|
| 2010/0261043 A1* | 10/2010 | Kim | H02J 7/0024 |
| | | | 429/61 |
| 2011/0221385 A1† | 9/2011 | Partovi | |
| 2012/0133310 A1 | 5/2012 | Lee | |
| 2017/0163060 A1* | 6/2017 | Zheng | H02J 7/0019 |
| 2018/0056798 A1 | 3/2018 | Syouda | |
| 2019/0064849 A1 | 2/2019 | O'Hara et al. | |

| | | | |
|---|---|---|---|
| 2019/0097436 A1 | 3/2019 | Ing et al. | |
| 2019/0126761 A1* | 5/2019 | Verbridge | H01M 10/4207 |
| 2019/0267680 A1† | 8/2019 | Toya | |
| 2019/0273389 A1* | 9/2019 | Kahnt | H02J 7/0047 |

FOREIGN PATENT DOCUMENTS

| | | | |
|---|---|---|---|
| WO | 2019084507 A1 | 5/2019 | |
| WO | 2019180699 A1 | 9/2019 | |

OTHER PUBLICATIONS

Patent Cooperation Treaty (PCT), International Searching Authority, Written Opinion of the International Searching Authority, PCT/US2021/012731, Dated Mar. 31, 2021.

European Patent Office, Extended European search report and European search opinion, European Application EP21738311.6, Dated Apr. 15, 2024.

Lamprecht, Alexander et al.; Improving fast charging efficiency of reconfigurable battery packs; 2018 Design, Automation & Test in Europe Conference; IEEE; 978-3-9819263-0-9/DATE18/c2018 EDAA.

Ci, S., Lin, N., &Wu, D. (2016). Reconfigurable battery techniques and systems: A survey. IEEE Access, 4, 1175-1189.†

\* cited by examiner
† cited by third party

US 12,630,052 B2

QUICK CHARGING MULTI-VOLTAGE BATTERY MANAGEMENT SYSTEM

PRIORITY

The present application is related to, and claims the priority benefit of, U.S. Provisional Patent Application Ser. No. 62/959,293, filed Jan. 10, 2020, the contents of which are incorporated herein directly and by reference in their entirety.

BACKGROUND

Charge current of batteries, especially fast charging lithium batteries, is currently limited by several factors. One of the main limitations is the physical connection and pathway for electrical power. Another battery charge current limitation is the componentry itself, such as the size and capabilities of the cables, harness, connectors, and power contactor. Currently, if a user wants a battery system with faster (shorter) charge times, then the battery systems are designed with either dual power paths, or with large and expensive power components to allow for increased charge current. It would certainly be desirable to have battery systems with faster charge rates without the complexity of dual power paths (using multiple connectors, etc.) and without the large and expensive power components.

In some industries, such as large warehouse operations, batteries need to be charged 24 hours a day just to meet normal operating needs (i.e., charging forklift batteries, workstation batteries, etc.) and these charge rates are critical to efficient around-the-clock business operations. Often, the electric utility providers also want these large warehouses to try and avoid charging batteries during peak hours. Large warehouses also want to be able to charge batteries quickly, often as fast as 5-10 minutes, to reduce downtime and increase productivity. However, the ability to reduce charge time is limited by the amount of current that can be delivered. Increasing charge current requires more expensive chargers and more expensive battery-to-charger connection systems. Thus, it would be desirable to develop a battery charging system which can allow more energy to be quickly put into the batteries during charging, without the need to upgrade the electrical infrastructure. Faster battery charging would mean that larger warehouse operations would operate more efficiently and have less downtime. It is also likely that customers would no longer need to charge batteries 24 hours a day, and thus they could choose when to charge their batteries, and could even avoid charging batteries during peak hours to save money.

BRIEF SUMMARY OF THE INVENTION

The present disclosure includes disclosure of a battery management system (BMS) for controlling the operating state of a battery pack device, the battery pack device comprising: a plurality of electrically coupled cell packs, each of the cell packs having a positive and a negative terminal thereon, and relays/contactors connected thereto, wherein the relays/contactors are reconfigurable to connect each of the cells packs in either parallel or in series; and wherein the battery management system controls opening and closing of the relays/contactors in each of the cell packs, and between each of the cell packs, to change an operating state of each of the cell packs from parallel to series.

The present disclosure also includes disclosure of a system, wherein the plurality of cell packs are configured by the BMS to operate in parallel, providing lower voltage and higher capacity.

The present disclosure also includes disclosure of a system, wherein the lower voltage and higher capacity results in more efficient battery discharge or usage operations.

The present disclosure also includes disclosure of a system, wherein the plurality of cell packs are configured by the BMS to operate in series, providing higher voltage and lower capacity.

The present disclosure also includes disclosure of a system, wherein the higher voltage and lower capacity results in faster battery charging.

The present disclosure also includes disclosure of a system, wherein the battery pack device is a 48 V., 600 Amp-hour battery pack device, when operated in parallel configuration.

The present disclosure also includes disclosure of a system, wherein the battery pack device may be fully charged within 60 minutes, when operated in series configuration.

The present disclosure also includes disclosure of a system, further comprising multiple additional battery management systems (BMSs), wherein the multiple BMS's control multiple additional battery pack devices and wherein the multiple BMS's communicate digitally to maintain equal voltages among the multiple additional battery pack devices.

The present disclosure also includes disclosure of a system, wherein the battery pack device further comprises a micro-processor-based controller or microcontroller (MCU) that executes a computer program and communicates with the BMS.

The present disclosure also includes disclosure of a system, wherein the battery pack device further comprises a switch, button, or other means for automatically notifying the BMS when placed into a battery charger, so that the BMS is prompted to reconfigure the relays/contactors during battery charging.

The present disclosure also includes disclosure of a system, wherein the BMS is housed within a battery charger configured to receive the battery pack device.

The present disclosure also includes disclosure of a system, wherein communication between the BMS and the battery pack device is bi-directional.

The present disclosure also includes disclosure of a system, wherein communication between the BMS and the battery pack device is uni-directional.

The present disclosure also includes disclosure of a system, further comprising multiple battery pack devices, wherein the BMS controls the operating state of each of the multiple battery pack devices.

The present disclosure also includes disclosure of a system, wherein one cell pack is designated as a primary cell pack and determines if the plurality of cell packs operate in parallel or in series.

The present disclosure also includes disclosure of a system, wherein the primary cell pack also determines overall health of the battery pack device.

The present disclosure also includes disclosure of a system, wherein at least one cell pack is designated as secondary and is responsible for communicating its health and status to the primary cell pack.

The present disclosure also includes disclosure of a method of changing an operating state of a battery pack device, comprising: placing the battery pack device into a battery charger, wherein the battery pack device comprises a plurality of electrically coupled cell packs, each of the cell packs having a positive and a negative terminal thereon, and relays/contactors connected thereto, wherein the relays/contactors are reconfigurable to connect each of the cell packs in either parallel or in series; and initiating communication between the battery pack device and a battery management system (BMS) to reconfigure relays/contactors between each of the cell packs within the battery pack device to change the operating state of the battery pack device.

The present disclosure also includes disclosure of a method, wherein initiating communication happens automatically when the battery pack device is coupled to the battery charger.

The present disclosure also includes disclosure of a method, wherein changing the operating state of the battery pack device comprises the step of reconfiguring the cells packs in either parallel or in series.

BRIEF DESCRIPTION OF THE DRAWINGS

The disclosed embodiments and other features, advantages, and disclosures contained herein, and the matter of attaining them, will become apparent and the present disclosure will be better understood by reference to the following description of various exemplary embodiments of the present disclosure taken in conjunction with the accompanying drawings, wherein.

Figure 1:
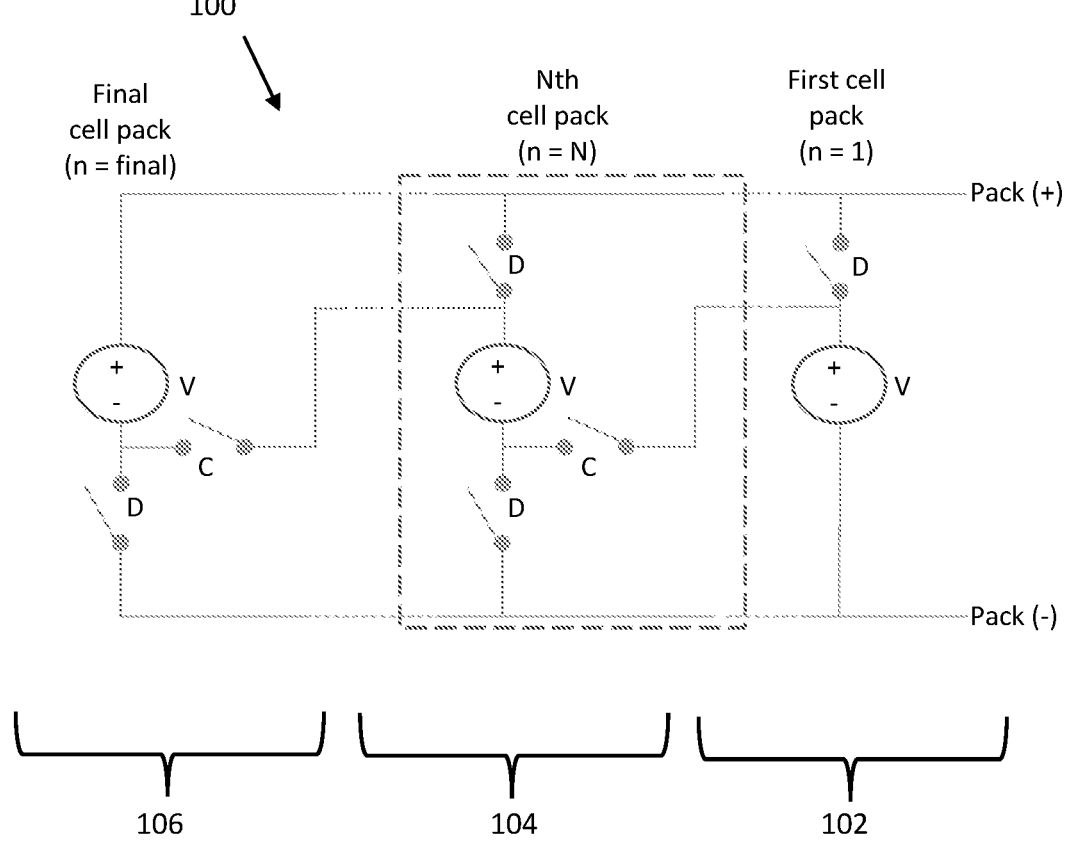
FIG. 1 illustrates an electrical block diagram of a battery pack having multiple cells therein.
Figure 2:
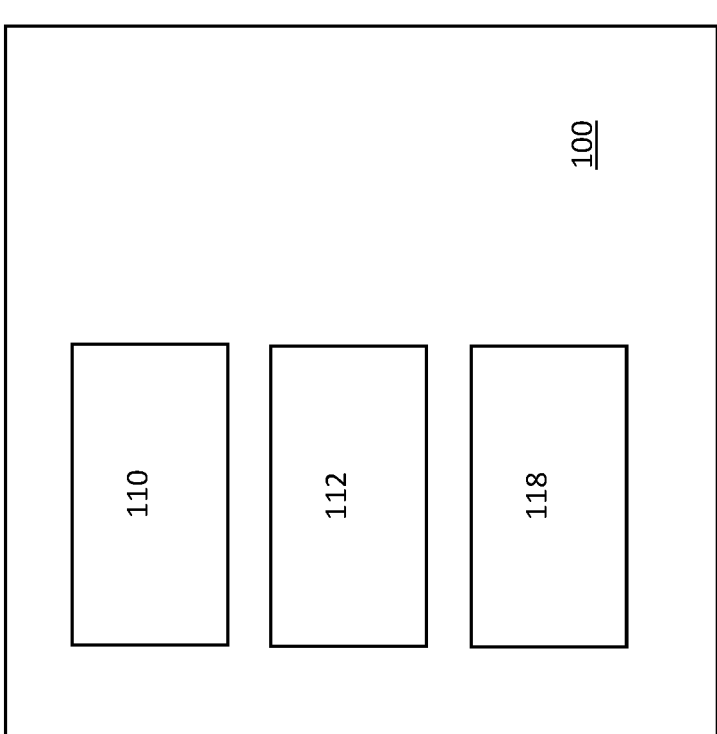
FIG. 2 illustrates a block diagram of a battery pack and battery charger and their respective components.
Figure 2:
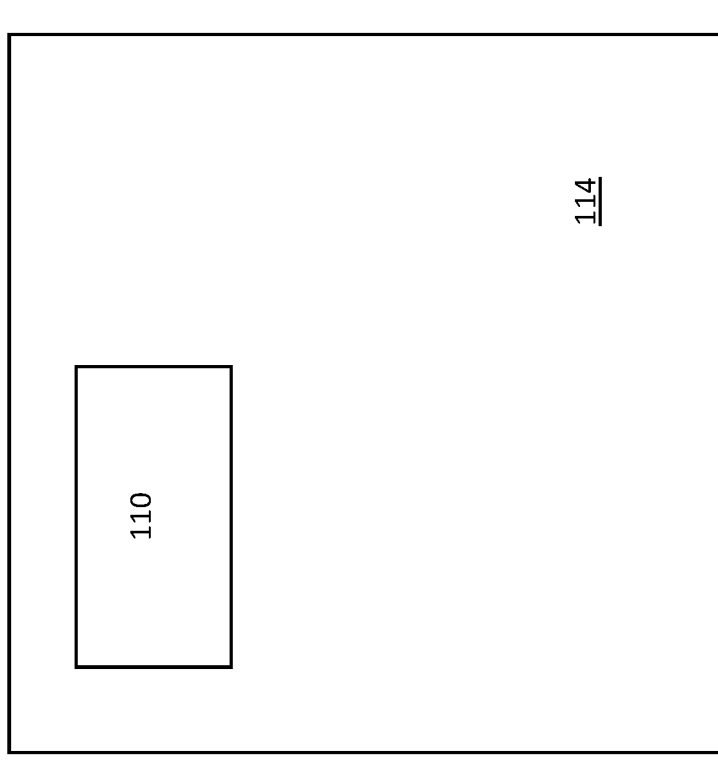

An overview of the features, functions and/or configurations of the components depicted in the various FIGURES will now be presented. It should be appreciated that not all of the features of the components of the figures are necessarily described. Some of these non-discussed features, such as various couplers, etc., as well as discussed features are inherent from the FIGURES themselves. Other non-discussed features may be inherent in component geometry and/or configuration.

DETAILED DESCRIPTION

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

Described herein are battery management systems (BMS) for operating battery packs 100, as shown in FIG. 1. The battery packs 100 may have multiple cells 102, 104, 106 therein. These battery packs 100 are capable of generating multiple different voltages to allow more energy (voltage× current) to be quickly and efficiently put into the battery, thus optimizing battery charging (i.e., reducing battery charging times). These battery packs 100 have the ability to change from operating in series, to operating in parallel, when desired, while utilizing affordable relays and more affordable electrical components. These battery packs 100 may be comprised of any number of cells (shown as N cells in FIG. 1) and can controlled and/or operated by the BMS, for optimal battery charging, or for optimal discharging, as desired. The BMS may be any type of control logic and/or software, operable to control and/or operate the battery packs 100.

For example, the battery packs 100 herein may be configured for higher voltage/lower capacity for faster battery charging. In this situation, the power required for charging the battery packs 10 remains constant, but the current required is reduced by increasing the voltage (as per P=V*I). Reducing the charge current reduces losses due to inherent impedances of cabling and other components in the charging circuit. Alternatively, these same battery packs 100 may also be configured for lower voltage/higher capacity for battery discharge (i.e., battery or equipment in use) situations.

FIG. 1 illustrates an electrical block diagram of a battery pack 100 (having multiple cells 102, 104, 106 therein) configured for both: 1) low voltage/high capacity discharge (i.e., operating in parallel); and 2) high voltage/low current charging (i.e., operating in series). The battery packs 100 disclosed herein operation using the standard power equation:

$$P=V*I$$

Power (watts)=Voltage (volts)*Current (amps).

A multi-cell battery pack 100 may be designed with multiple relays, switches, or contactors, as shown in FIG. 1 ("C" or "D"), for example. As shown in FIG. 1 (at the right-hand side), the first cell pack 102 (n=1) may have a contactor/relay ("D") coupled to its positive terminal. The first cell pack 102 (n=1) is also coupled to the Nth cell pack 104 (n=N) at its negative terminal. The Nth cell pack 104 may also have contactors/relays coupled to both its positive and negative terminals (as well as to the first cell pack 102). The Nth cell pack 104 (in the middle in FIG. 1) may be coupled to many other N-cell packs, and/or then may ultimately be coupled to the last or final cell pack 106 (n=final) via a contactor or relay (coupled to negative terminal of the final cell pack 106). The final cell pack 106 (n=final) may also have an additional contactor/relay coupled to its negative terminal (as well as a contactor/relay coupled to the Nth cell pack 104). It should be understood that the battery packs 100 shown and described herein are exemplary only for the purposes of illustration and may comprise any number (n) of cells therein, and may utilize a variety of different voltages.

For discharge:
Close contactors labeled "D"
Discharge voltage=Cell pack voltage
Discharge capacity=(Cell pack capacity)*(n cell packs)
For charge:
Close contactors labeled "C"
Charge voltage=(Cell pack voltage)*(n cell packs)
Charge capacity=Cell pack capacity
As shown in FIG. 1, during battery discharge operations, the battery pack's 100 discharge capacity will be equal to the cell pack voltage, and the battery pack's 100 discharge capacity will be equal to the cell pack capacity*N cell packs (i.e., cell packs arranged in parallel). Alternatively, during battery charging operations, the battery pack's 100 charge voltage will be equal to the cell pack voltage*N cell packs, and the battery pack's 100 charge capacity will be equal to the cell pack capacity (i.e., cell packs arranged in series).

In one exemplary embodiment, the cells 102, 104, and 106 may each comprise a 9V battery connected in parallel. In this example, the voltage of each battery is 9V and can source 1 amp-hour, so when the 3 batteries are in parallel, you only get 9V at a time, but you can source 3 amp-hours total. Alternatively, when each of those same 3 9V cells are reconfigured in series (rather than parallel), then it provides 27V (9V+9V+9V), but only 1 amp-hour. Thus, having the cells 102, 104, 106 operate in series (instead of parallel) provides more voltage (27V instead of 9V) and less capacity (1amp-hour instead of 3 amp-hour), which allows for faster (⅓ the time) and more efficient (less loss due to internal resistances) battery charging without increasing cabling and charger cost. However, having the same cells 102, 104 and 106 configured in parallel provides lower voltage and higher current or longer use time, such as may be needed during normal battery discharge operation. The ability to change back and forth between operating in series v. parallel is very advantageous and may provide significantly more efficient charging and discharging operations. In one exemplary embodiment, if the battery pack device 100 is a 48 Volt 600 Amp-hour battery pack 100 for discharge use, it may be fully charged within 60 minutes when configured in series (vs. a previous time of 120 minutes to charge when in old/parallel configuration).

In some embodiments, the BMS 110 may be software or control logic or similar and may communicate with the battery pack 100 in any number of ways, such as wirelessly and/or via microcontrollers or microprocessors 112. In some embodiments, the BMS 110 may be housed within, or integral with, a battery charger 114. In other embodiments, the BMS 110 may be housed within, or integral with, a battery pack 100. In yet additional embodiments, the BMS may be external and may communicate wirelessly with the battery charger 114 and/or battery pack 100. Additionally, the communication between the BMS 110 and the battery pack(s) 100 may be in only one direction (i.e., from the BMS 110 to the battery pack 100) or may flow in both directions (i.e., back and forth between both the BMS and the battery pack 100).

In one exemplary embodiment, one cell within battery pack 100 may be designated as the "primary" cell and may oversee the battery pack 100 configuration and determine whether the cells of the battery pack 100 will operate in parallel or series. Other cells within battery pack 100 may be known as "secondary" cells. Secondary cells may be responsible for maintaining their health and communicating their status to the primary cell. The primary cell may also determine overall health of the battery pack 100.

The reconfigurable contactors, relays, or switches shown and described as "D" or "C" in FIG. 1 may be operable via the BMS. In operation, the BMS (software or control logic or similar) may close the contactors labeled as "D" (and open the contactors labeled as "C" in FIG. 1), thus instructing the cells 102, 104, 106 to operate in parallel, which is ideal for battery discharge (i.e., battery packs in use) operations. Alternatively, the BMS may close the contactors labeled as "C" (and open the contactors labeled as "D" in FIG. 1), thus instructing the cells 102, 104, 106 to operate in series, which is ideal for charging the battery pack 100.

In some embodiments, the battery pack 100 may further be configured with a switch, button, or other mechanism 118 which, when manually activated, may notify the BMS 110 that reconfiguration of the cells 102, 104, 106 is necessary. In other embodiments, simply placing the battery pack 100 into a battery charger may automatically notify the BMS 110 that reconfiguration of the cells 102, 104, 106 is necessary. For example, the battery pack 100 may be configured such that when it is placed into a battery charger, the BMS 110 is notified and then automatically opens or closes contactors, relays, or switches (as necessary) to configure the cells 102, 104, 106 into series arrangement (i.e., providing high voltage and low capacity) for optimal battery charging. Alternatively, when the battery is removed from a battery charger, the BMS 110 may also be automatically notified and may again open or close contactors (as necessary) to reconfigure the cells 102, 104, 106 into parallel arrangement (i.e., low voltage and high capacity) for optimal battery usage/discharge operations.

In some embodiments, it may be desirable to the functionality of the battery packs 100 to keep their voltages equal to that of other battery pack's 100 voltages, so that the battery packs 100 can be combined without surges. Digital serial communication between the battery pack's 100 BMS's will allow for each battery pack's 100 BMS to know the target voltage for balancing. In some embodiments, one BMS may control one battery pack 100. However, in alternative embodiments, one BMS may control multiple battery packs 100.

While various embodiments of devices for multi-cell battery management and methods for multi-cell battery management have been described in considerable detail herein, the embodiments are merely offered as non-limiting examples of the disclosure described herein. It will therefore be understood that various changes and modifications may be made, and equivalents may be substituted for elements thereof, without departing from the scope of the present disclosure. The present disclosure is not intended to be exhaustive or limiting with respect to the content thereof.

Further, in describing representative embodiments, the present disclosure may have presented a method and/or a process as a particular sequence of steps. However, to the extent that the method or process does not rely on the particular order of steps set forth therein, the method or process should not be limited to the particular sequence of steps described, as other sequences of steps may be possible. Therefore, the particular order of the steps disclosed herein should not be construed as limitations of the present disclosure. In addition, disclosure directed to a method and/or process should not be limited to the performance of their steps in the order written. Such sequences may be varied and still remain within the scope of the present disclosure.

The invention claimed is:

1. A battery management system (BMS) for controlling the operating state of a battery pack device, the battery pack device comprising:
   at least three electrically coupled cell packs, each of the cell packs having a positive and a negative terminal thereon, and relays/contactors connected thereto, wherein the relays/contactors are reconfigurable to connect each of the cell packs in either parallel or in series; and
   wherein the battery management system controls opening and closing of the relays/contactors in each of the cell packs, and between each of the cell packs, to change an operating state of each of the cell packs from parallel to series;
   wherein one cell pack of the at least three cell packs is designated as a primary cell pack, and at least one cell pack is designated as secondary and is responsible for communicating its health and status to the primary cell pack; and
   wherein the primary cell pack determines overall health of the battery pack device.

2. The system of claim 1, wherein the at least three cell packs are configured by the BMS to operate in parallel, providing lower voltage and higher capacity.

3. The system of claim 1, wherein the at least three cell packs are configured by the BMS to operate in series, providing higher voltage and lower capacity.

4. The system of claim 3, wherein the higher voltage and lower capacity results in faster battery charging.

5. The system of claim 3, wherein the battery pack device is a 48 V., 600 Amp-hour battery pack device, when operated in parallel configuration.

6. The system of claim 5, wherein the battery pack device is fully charged within 60 minutes, when operated in series configuration.

7. The system of claim 1, further comprising multiple additional battery management systems (BMSs), wherein the multiple BMS's control multiple additional battery pack devices and wherein the multiple BMS's communicate digitally to maintain equal voltages among the multiple additional battery pack devices.

8. The system of claim 1, wherein the battery pack device further comprises a micro-processor-based controller or microcontroller (MCU) that executes a computer program and communicates with the BMS.

9. The system of claim 1, wherein the battery pack device further comprises a switch, button, or other means for automatically notifying the BMS when placed into a battery charger, so that the BMS is prompted to reconfigure the relays/contactors during battery charging.

10. The system of claim 1, wherein the BMS is housed within a battery charger configured to receive the battery pack device.

11. The system of claim 1, wherein communication between the BMS and the battery pack device is bi-directional.

12. The system of claim 1, wherein communication between the BMS and the battery pack device is uni-directional.

13. The system of claim 1, further comprising multiple battery pack devices, wherein the BMS controls the operating state of each of the multiple battery pack devices.

14. A method of changing an operating state of a battery pack device, comprising:

placing the battery pack device into a battery charger, wherein the battery pack device comprises at least three electrically coupled cell packs, each of the cell packs having a positive and a negative terminal thereon, and relays/contactors connected thereto, wherein the relays/contactors are reconfigurable to connect each of the cell packs in either parallel or in series; and initiating communication between the battery pack device and a battery management system (BMS) to reconfigure relays/contactors between each of the cell packs within the battery pack device to change the operating state of the battery pack device, wherein one cell pack of the at least three cell packs is designated as a primary cell pack; designating at least one cell pack as secondary, the secondary cell pack being responsible for communicating its health and status to the primary cell pack; and wherein the primary cell pack determines overall health of the battery pack device.

15. The method of claim 14, wherein initiating communication happens automatically when the battery pack device is coupled to the battery charger.

16. The method of claim 14, wherein changing the operating state of the battery pack device comprises the step of reconfiguring the cell packs in either parallel or in series.

* * * * *